US006697116B1

(12) United States Patent
Kurokawa et al.

(10) Patent No.: US 6,697,116 B1
(45) Date of Patent: Feb. 24, 2004

(54) OBSERVATION APPARATUS AND METHOD OF CONTROLLING LIGHT EMISSION THEREOF

(75) Inventors: Shuji Kurokawa, Ageo (JP); Kenji Kobayashi, Omiya (JP)

(73) Assignee: Lintec Corporation (JP)

( * ) Notice: Subject to any disclaimer, the term of this patent is extended or adjusted under 35 U.S.C. 154(b) by 0 days.

(21) Appl. No.: 09/229,468

(22) Filed: Jan. 13, 1999

(30) Foreign Application Priority Data

Jan. 30, 1998 (JP) .......................................... 10-033823

(51) Int. Cl.[7] .............................................. H04N 5/222
(52) U.S. Cl. .......................................... 348/371; 348/68
(58) Field of Search ................................. 348/371, 312, 348/311, 216.1, 217.1, 227.1, 228.1, 54, 61, 65, 68, 86, 87, 92, 125, 126, 132, 221.1; 356/237.2, 239.1, 239.3, 394, 613

(56) References Cited

U.S. PATENT DOCUMENTS

| 4,535,758 A | * | 8/1985 | Longacre, Jr. ............... 348/371 |
| 4,875,093 A | * | 10/1989 | Koishi et al. .................. 348/61 |
| 5,043,801 A | | 8/1991 | Watanabe |
| 5,047,846 A | * | 9/1991 | Uchiyama et al. ............. 348/61 |
| 5,076,697 A | * | 12/1991 | Takagi et al. ................ 356/394 |
| 5,097,340 A | * | 3/1992 | Tanabe et al. ............... 348/371 |
| 5,229,856 A | * | 7/1993 | Koshiishi ..................... 348/317 |
| 5,264,925 A | * | 11/1993 | Shipp et al. ................. 348/269 |
| 5,280,542 A | | 1/1994 | Ozeki et al. |
| 5,396,334 A | * | 3/1995 | Sugawara ..................... 356/394 |
| 5,774,212 A | * | 6/1998 | Corby, Jr. .................. 356/237.2 |
| 5,848,188 A | * | 12/1998 | Shibata et al. .............. 348/132 |
| 6,124,889 A | * | 9/2000 | Landowski .................. 348/312 |
| 6,400,455 B1 | * | 6/2002 | Kurokawa et al. ........ 356/239.1 |

FOREIGN PATENT DOCUMENTS

| GB | 2302435 A | 1/1997 |
| JP | 58-061452 | * 12/1983 |
| JP | 4215379 | 8/1992 |

* cited by examiner

Primary Examiner—Aung S. Moe
(74) Attorney, Agent, or Firm—Marger Johnson & McCollom, P.C.

(57) ABSTRACT

An observation apparatus is equipped with a light-emitting portion for shining light onto an observation object, an image detector for receiving light reflected from or passing through the observation object, a light emission period establisher for establishing a light emission period for the light-emitting portion, and a light emission controller which activates the light-emitting portion to emit light synchronous with a vertical synchronizing signal of the image detector, and which terminates the emission of light from the light-emitting portion after the established light emission period has elapsed.

7 Claims, 5 Drawing Sheets

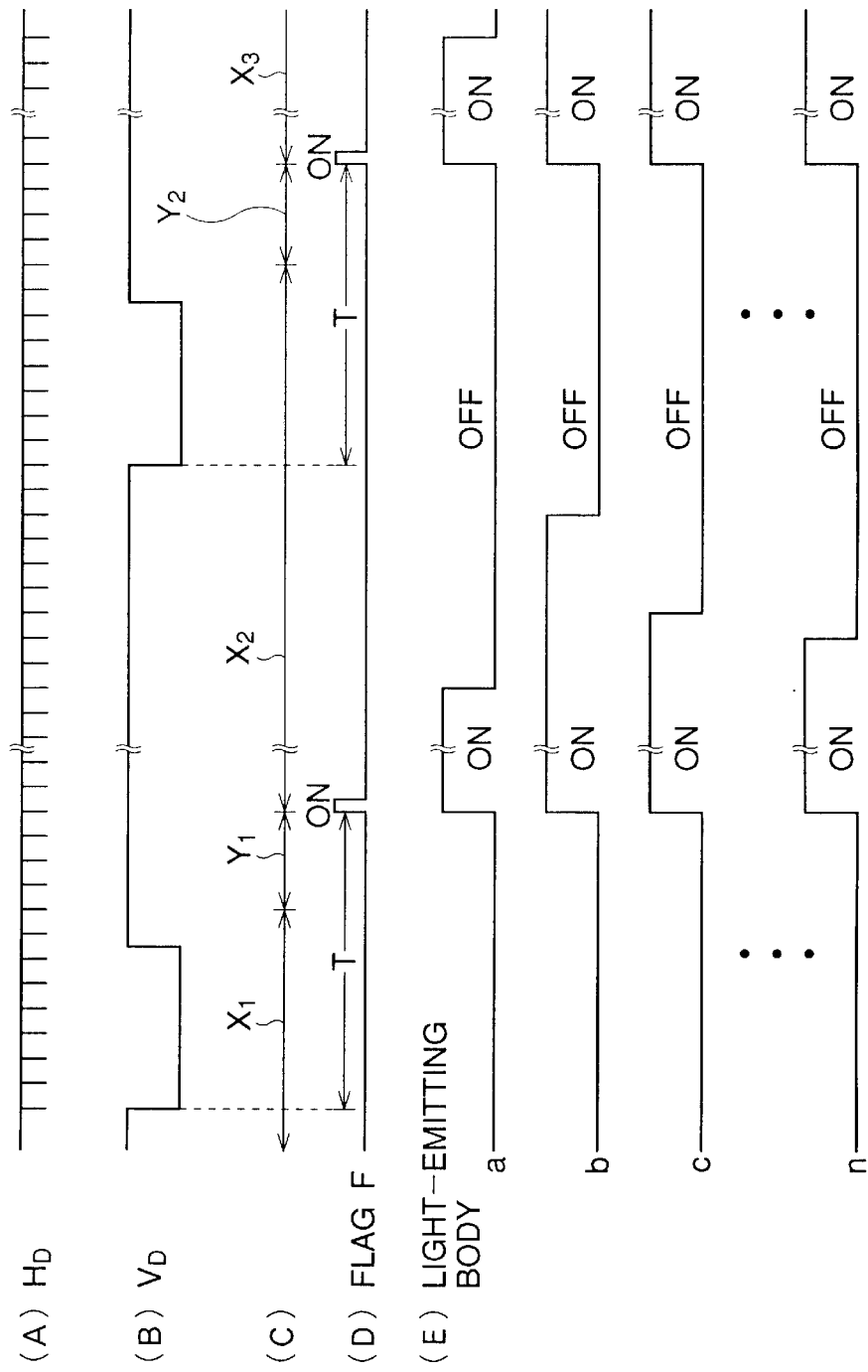

OBSERVATION APPARATUS AND METHOD OF CONTROLLING LIGHT EMISSION THEREOF

BACKGROUND OF THE INVENTION

1. Field of the Invention

The present invention relates to an observation apparatus, and in particular to an observation apparatus for observing patterns such as circuits and characters formed in the surface or near the surface of semiconductor wafers and insulation substrates such as glass, ceramic and the like.

2. Description of the Prior Art

Up to now, during the manufacturing process of semiconductor integrated circuits, observation of patterns such as numbers, characters and circuits provided on the surface of semiconductor wafers (hereinafter referred to simply as "wafer"), liquid crystal substrates, glass, ceramic or resin have been carried out with an image detector such as a camera or the like. For example, during the manufacturing process, the identification code provided on a wafer is read, and then a predetermined process is carried out in accordance with such identification code.

In prior art observation devices, the amount of light received by an image detector (e.g., a camera) is adjusted by changing the emission intensity of the light source, and this is carried out by changing the current value or voltage value of the driving current of the light-emitting bodies.

Namely, in such prior art observation devices, a variable current driving circuit or a variable voltage driving circuit must be used for the driving circuit that drives the light-emitting portion. Consequently, the driving circuit of the light-emitting portion becomes relatively complex, and the overall size becomes larger as the number of light-emitting bodies capable of separate light emission is increased.

SUMMARY OF THE INVENTION

With a view toward overcoming the problems described above, it is an object of the present invention to provide an observation apparatus equipped with a simplified driving circuit for driving light-emitting bodies.

In order to achieve the object stated above, the observation apparatus of present invention is equipped with a light-emitting portion for shining light onto an observation object, image detection means for receiving light reflected from or passing through the observation object, light emission period establishing means for establishing a light emission period for the light-emitting portion, and light emission control means which activates the light-emitting portion to emit light synchronous with a vertical synchronizing signal of the image detection means, and which terminates the emission of light from the light-emitting portion after the established light emission period has elapsed.

Further, it is possible to use a horizontal synchronizing signal of the image detection means as a timing means to time the light emission period.

BRIEF DESCRIPTION OF THE DRAWINGS

FIG. 5 is a timing chart for describing the illumination operation of the observation apparatus.

DETAILED DESCRIPTION OF THE PREFERRED EMBODIMENTS

Figure 1:
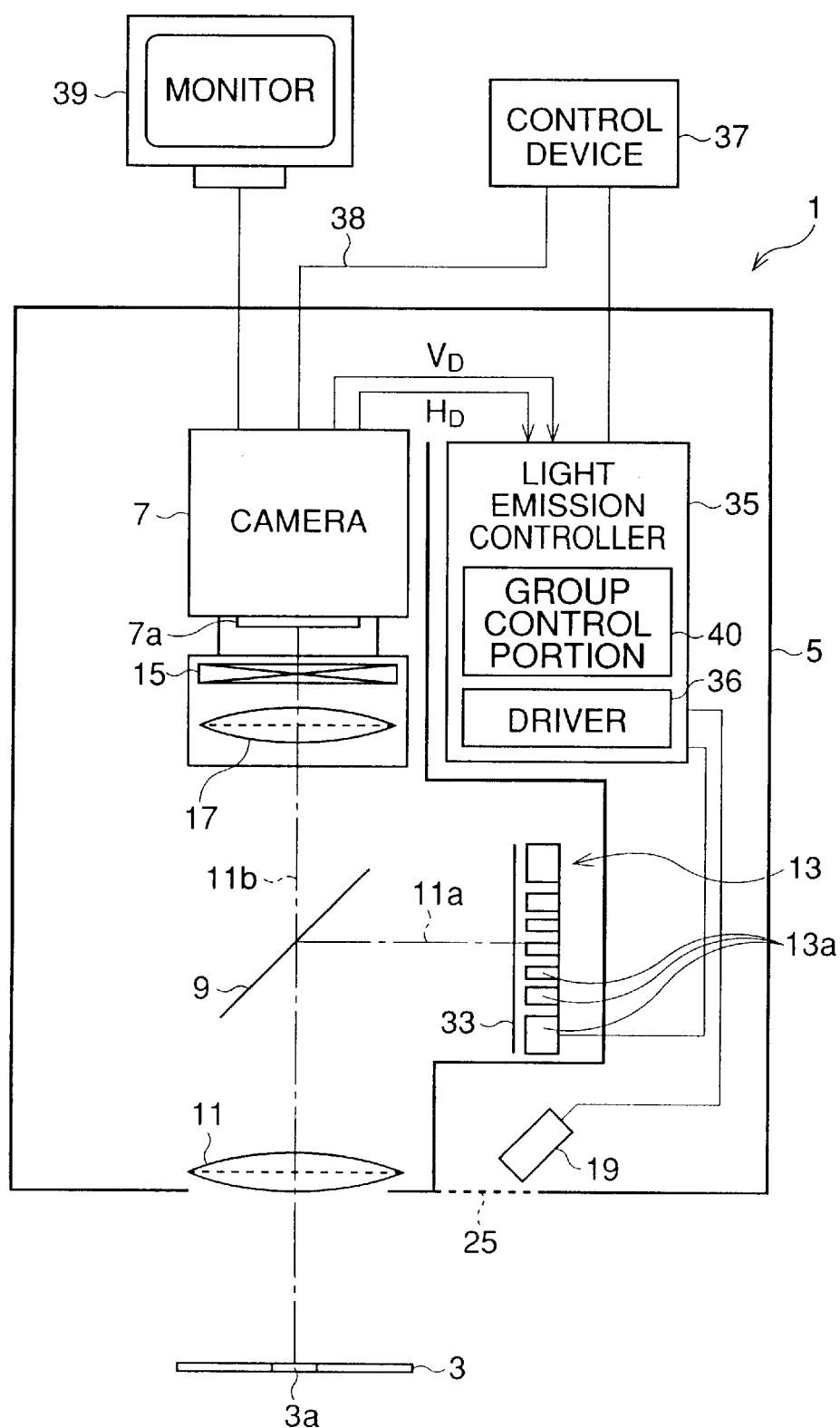
FIG. 1 is a block diagram showing an embodiment of the present invention.
Figure 2:
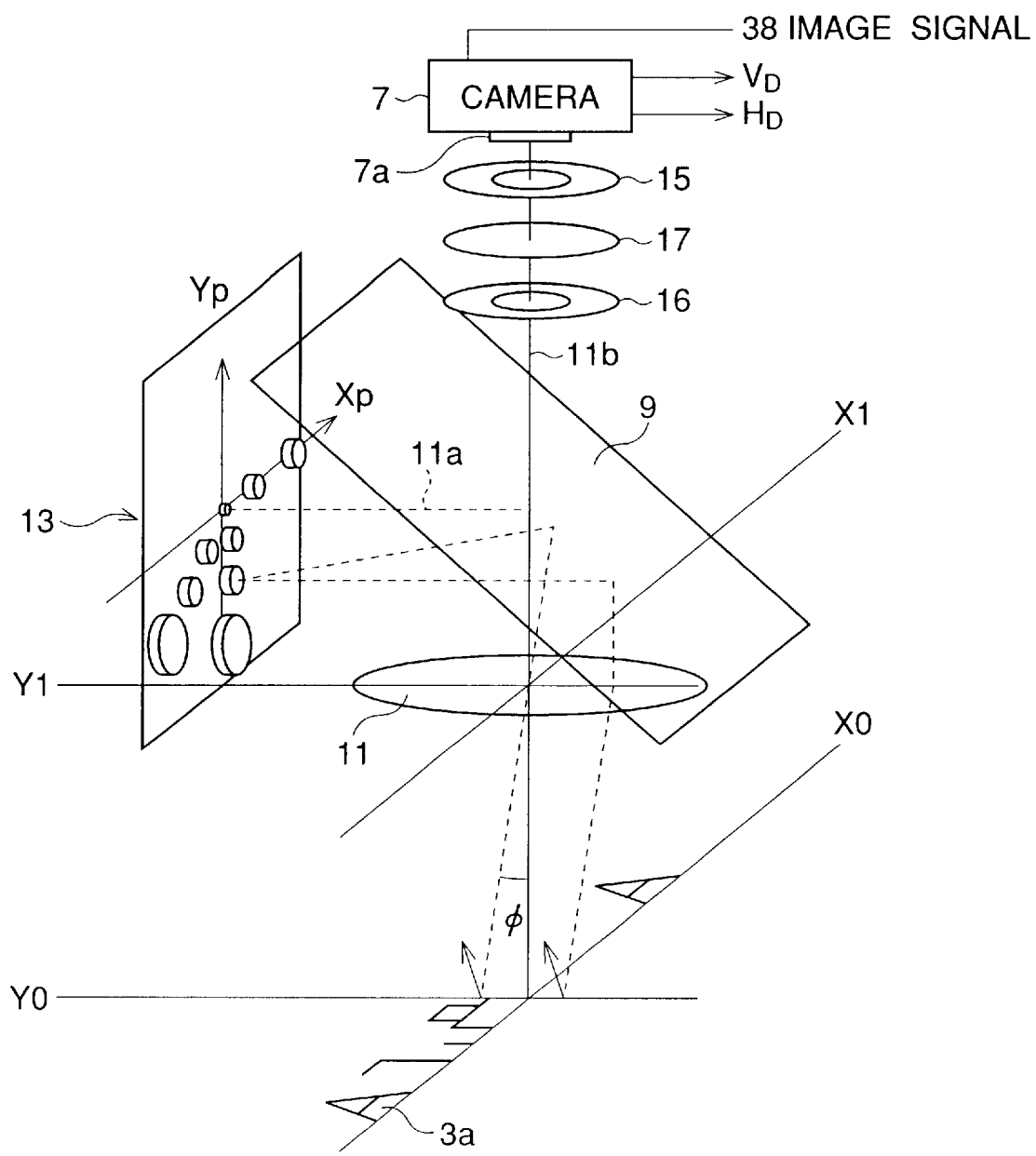
FIG. 2 is a drawing showing the main portion of the optical system of the apparatus shown in FIG. 1.

FIG. 1 is a structural diagram showing the overall structure of an observation apparatus according to an embodiment of the present invention, and FIG. 2 is a perspective view showing the main portion of the optical system.

As shown in these drawings, an observation apparatus 1 is used to observe an observation object 3a such as characters or patterns formed in a wafer 3. Each of the structural elements of the observation apparatus 1 are housed in a box 5, and a CCD camera 7 as image detection means, a half mirror 9 and a converging lens 11 are arranged from the top of the box 5 to the bottom. In this arrangement, the converging lens 11 functions both as a lens for converging light emitted from a light-emitting portion 13 and as an objective lens arranged between the observation object 3a and a light-receiving portion 7a when forming an image of the observation object 3a onto the light-receiving portion 7a. The light-emitting portion 13 is arranged at the front focal point position of the converging lens 11, and light from the light-emitting portion 13 is reflected downward by the half mirror 9 and converged by the converging lens 11 to shine onto the observation object 3a. Further, the converging lens 11 has an optical axis 11b which passes through the half mirror 9, and an optical axis 11a due to reflection by the half mirror 9.

The camera 7 is equipped with a diaphragm 15 and an image-forming lens 17, and reflected light from the observation object 3a passes through the half mirror 9, the image-forming lens 17, and the diaphragm 15 in this order, and forms an image on the light-receiving portion 7a (such as a CCD element) of the camera 7. Further, another diaphragm (the diaphragm 16 shown in FIG. 2) may be provided between the image-forming lens 17 and the half mirror 9.

The light-emitting portion 13 is equipped with a plurality of light-emitting bodies (e.g., LEDs) 13a, and a diffuser 33 is arranged in front of all the light-emitting bodies 13a. Each of the light-emitting bodies 13a are selectively driven by a light emission controller 35 (described below). Further, a light-emitting body 19 is provided in a lower portion of the observation apparatus 1 so as to shine light onto the observation object 3a at a large incidence angle, and a diffuser 25 is arranged in front of the light-emitting body 19.

The light-emitting portion 13 and the light-emitting body 19 are controlled by the light emission controller 35. The light emission controller 35 is constructed from a driver 36 and a group control portion 40, in which the driver 36 controls the ON/OFF states of each of the light-emitting bodies and the period of light emission thereof. The group control portion 40 separates the light-emitting bodies 13a of the light-emitting portion 13 and the light-emitting body 19 into groups and specifies which group of light-emitting bodies to use for light emission in accordance with the observation object 3a. The light emission controller 35 is controlled by a control device (e.g., a computer) 37 equipped with a system such as an OCR system or a pattern inspection system. Further, image signals 38 from the camera 7 are outputted to a monitor 39 (which functions as a display means) and the control device 37, with an image recognition process being carried out in the control device 37.

Figure 3:
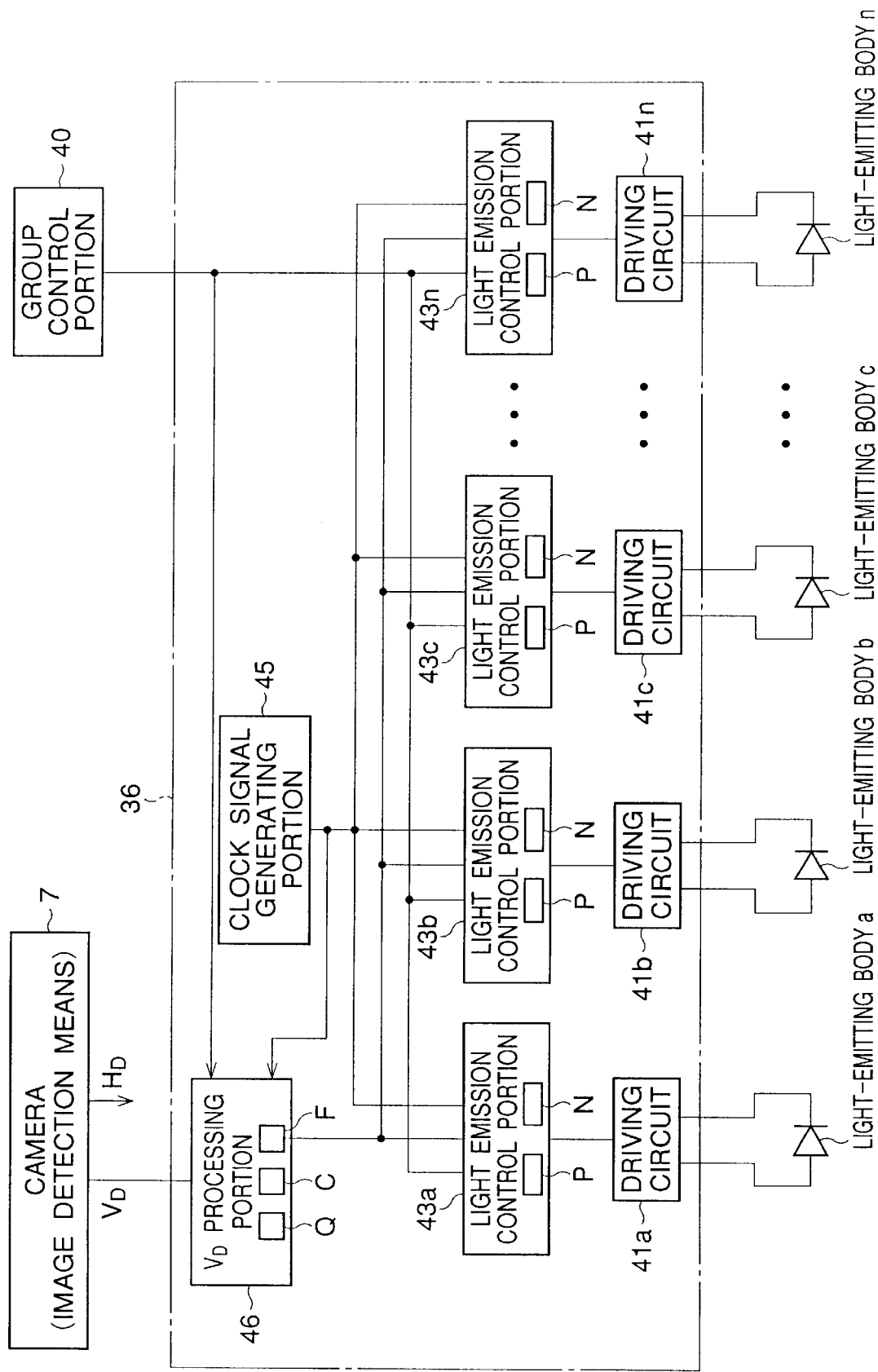
FIG. 3 is a block diagram showing a structure of a driver for the light-emitting bodies.

As shown in FIG. 3, the driver 36 is equipped with driving circuits 41a, 41b, 41c, . . . , 41n for respectively driving light-emitting bodies a, b, c, . . . ,n; light emission control portions 43a, 43b, 43c, . . . , 43n for respectively controlling the driving circuits 41a, 41b, 41c, . . . , 41n; a clock signal generating portion 45 which sends a clock signal to each of the light emission control portions 43a, 43b, 43c, . . . , 43n; and a $V_D$ processing portion 46 which delays the vertical synchronization signal $V_D$ of the camera 7 by a prescribed time period T. In this connection, the vertical synchronization signal $V_D$ is generally used as a base signal for camera operations, and in this way the vertical synchronization signal $V_D$ forms a reference signal (described below) for possible light reception timing or image output signals.

Each of the light control portions 43 is equipped with a preset portion P which stores an initial value showing a single light emission period as a clock signal quantity, and a counting portion N which inputs the initial value and subtracts by 1 each time a clock signal is received.

The $V_D$ processing portion 46 is equipped with a preset portion Q which stores a prescribed time period T over which each of the light-emitting bodies will be activated to emit light from the time the $V_D$ signal is generated, a subtraction counter C which receives the T value from the preset portion Q and carries out a subtraction process on such T value, and a flag resistor F (hereafter referred to simply as "flag F") which enters an ON state when the value of the subtraction counter C becomes 0. Further, the prescribed time period T is set in the preset portion Q in accordance with a signal from the group control portion 40.

The ON signal of the flag F of the $V_D$ processing portion 46 is outputted to each of the light emission control portions 43a, 43b, 43c, . . . , 43n. From the group control portion 40, control signals such as the above-mentioned initial value, light-emitting body selecting signals and light emission termination signals are outputted to each of the light emission control portions 43a, 43b, 43c, . . . , 43n. Further, the light-emitting bodies a, b, c, . . . , n form the light-emitting bodies 13a and 19 of FIG. 1.

As will be described below, because the clock signal is used as a timing unit to carry out timing of the light emission time period of the light-emitting bodies within the $V_D$ signal period, time control becomes more precise as the period of the clock signal is made shorter than the period of the $V_D$ signal. Further, in the case where the clock signal generating portion 45 can utilize a horizontal synchronizing signal $H_D$, such $H_D$ signal is inputted and distributed as a clock signal to each of the light emission control portions 43, and this creates a simplified circuit structure. In the case where the camera 7 is a NTSC standard camera, the $H_D$ signal is generated approximately 280 times in one period of the $V_D$ signal, and this makes it possible for the observation apparatus of the present invention to carry out control of the light emission intensity at a precision of approximately 1/280. In the case where the camera 7 is a PAL standard or HDTV standard one, a higher multistage precision control can be carried out. In the case where a $H_D$ signal can not be utilized, a signal is self-induced and distributed as a clock signal to each of the light emission control portions 43. Further, it is also possible to split the $H_D$ signal to form a clock signal having an even shorter period.

Next, a description of the operation of the observation apparatus 1 will be given with reference to FIG. 5.

Namely, when the observation apparatus 1 is to be used as a reading apparatus for reading fetters or characters formed in a wafer, the first step involves placing the observation apparatus 1 of the present invention at an appropriate position in the semiconductor manufacturing process. Then, a wafer is manually or automatically conveyed to a location where the observation object 3a is positioned directly below the converging lens 11.

Next, the camera 7 generates a $V_D$ signal which is then sent to the $V_D$ processing portion 46, and a prescribed time period T is sent from the preset portion Q to the counter C. Then, after a clock signal has been inputted into the $V_D$ processing portion 46 from the clock signal generating portion 45, the value of the counter C is subtracted by 1 each time a clock signal is received. When the value of the counter C reaches 0, the flag F is turned ON. Namely, the flag F is turned on after the prescribed time period T starting from the input of the $V_D$ signal has elapsed.

Further, at the same time the $V_D$ signal is generated, the group control portion 40 outputs an initial value to the preset portions P of each of the light emission control portions 43. This initial value can be freely set for each of the light-emitting bodies by carrying out an outside operation. Next, the light emission control portions 43 send the initial value to their respective counter portions N. Then, referring to the flags F, if the flags F are in an ON state, they are reset to an OFF state, and each of the light-emitting body driving circuits 41 are driven to activate the light-emitting bodies to emit light.

Next, when a clock signal is inputted, the value of the counter portion N of each of the light emission control portions 43 is subtracted by 1, and this process is continued each time a clock signal is inputted until all the counter portions N reach 0. During this time, the light-emitting bodies having a counter portion N>0 will be in a light-emitting ON state, and the light-emitting bodies having a counter portion N≦0 will be in a non-light-emitting OFF state. When all the counter portions N reach 0, all the light-emitting bodies will be in an OFF state.

Namely, the light emission period of the light-emitting bodies is calculated by multiplying the initial value by one cycle of the clock signal generation period, and longer light emission periods result in a greater amount of light being received by the camera 7. This light emission period can be set for each light-emitting body. For example, as shown in FIG. 5(E), the light-emitting bodies a, n, c and b having increasingly longer light emission periods in that order, and therefore the camera 7 will receive increasingly larger amounts of light in that respective order.

As described above, after generating the $V_D$ signal, the light-emitting bodies are kept in a non-light-emitting OFF state for a prescribed time period T, and the reason for this can be understood with reference to the example shown in FIG. 5(C) where a CCD camera is capable of receiving light during the periods $X_1$, $X_2$, $X_3$, . . . , but is incapable of receiving light during the periods $Y_1$, $Y_2$, . . . , and for this reason the prescribed time period T is established to have the light-emitting bodies emit light after the periods $Y_1$, $Y_2$, . . . (in which no light reception is possible) are over. Now, because the periods $Y_1$, $Y_2$, . . . are synchronized with the vertical synchronizing signal $V_D$, light emission is carried out with the light-emitting bodies also synchronized (at the same time or at a fixed relationship) with the vertical synchronizing signal $V_D$.

Figure 4:
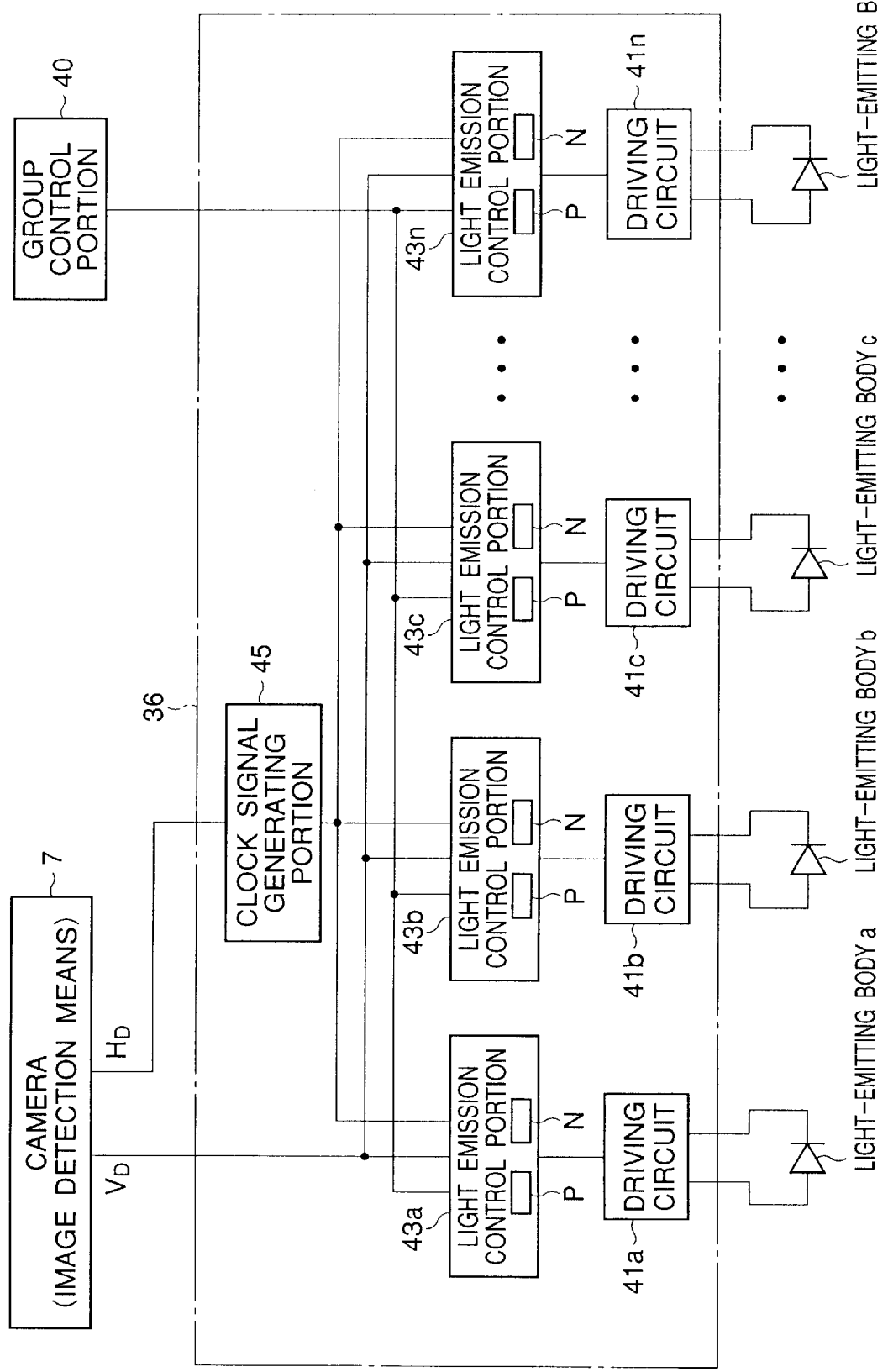
FIG. 4 is a block diagram showing another structure of a driver for the light-emitting bodies.

Further, in the case where the periods Y in which the camera 7 is incapable of receiving light can be ignored (i.e., assumed close enough to 0), and where the time period from the generation of the vertical synchronizing signal $V_D$ to the time where light reception is not possible is short enough to be ignored, it is possible to eliminate the $V_D$ processing portion 46, as shown in FIG. 4, and the light-emitting bodies 13a and 19 can be constructed to emit light at the time the $V_D$ signal is generated.

Now, if the light emission period of each of the light-emitting bodies is not the same or shorter than one period of the vertical synchronizing signal $V_D$, the vertical synchronizing signal $V_D$ will be overlooked. Further, if the light emission period is set at a value obtained by subtracting the period in which the camera is incapable of receiving light from the period of $V_D$, it becomes possible to avoid the emission of wasted light during the period in which the camera is incapable of receiving light.

After all the counter portions N become equal to 0, reference is made as to whether a light emission termination signal has been inputted. If a light emission termination signal has not been inputted, the process returns to the beginning of the operations, and the light emission operations are repeated. Then, when the image recognition of the observation object 3a is completed, for example, a light emission termination signal is outputted from the control device 37 via the group control portion 40.

Now, when the one or more light-emitting body from the light-emitting bodies 13a and 19 is selectively activated, the observation object 3a becomes illuminated and this allows the camera 7 to pick up images which are then deciphered into letters and characters by the control device 37. Which light-emitting bodies will be activated and how long such activation will take place is determined by the initial value outputted from the group control portion 40. In the case where the reading result is in error or insufficient, it is possible not to output the light emission termination signal to continue light emission with the light-emitting bodies, and in this case, the observation object 3a can be read by repeating illumination under the same light emission conditions or under conditions in which the light-emitting bodies or the light emission period is changed. After reading is completed, the light emission termination signal is outputted from the group control portion 40 to terminate illumination operations. Then, when all operations are completed, the next wafer 3 is conveyed into position and the above operations are begun again.

As described above, instead of changing the light emission intensity of each light-emitting body to control the amount of light received by the camera, in the observation apparatus according to the present invention, such control is carried out by changing the light emission period of the light-emitting bodies. As a result, there is no need for the variable current driving circuit or variable voltage driving circuit required in prior art devices, and because the driving circuit in the observation apparatus of the present invention can be constructed, for example, from a simple fixed voltage circuit such as an open collector drive of a transistor, the present invention makes it possible to construct compact driving circuits. In particular, in cases where there is a need for a large number of light-emitting bodies, the driving circuits of the observation apparatus according to the present invention can be made even more compact than those of prior art devices.

Further, instead of carrying out a continuous light emission as is done in the prior art, the observation apparatus according to the present invention carries out light emission only at those times when illumination is required, and this makes it possible to suppress heat generation due to wasted light emission. In this way, the present invention makes it possible to construct an observation apparatus that is economical in terms of energy consumption.

Further, in the observation apparatus described above, the use of a half mirror 9 to form a branching optical path onto which the light source is arranged makes it possible for the converging lens 11 to function both as a converging lens and an objective lens. However, the present invention is not limited to this structure, and it is possible to eliminate the half mirror and use separate objective and converging lenses. However, the use of the half mirror 9 is preferred because the ability of the converging lens 11 to function both as a converging lens and an objective lens makes it possible to construct a compact observation apparatus. Further, the observation apparatus according to the present invention is not limited to the above-described optical system in which observation is carried out using light reflected from the observation object, and it is possible provide the observation apparatus with an optical system in which the light emitted from the light-emitting bodies is adapted to pass through the observation object, with observation of the observation object being carried out using the light that passes through the observation object.

Furthermore, even though the light emission control portions and the $V_D$ processing portion were described as hardware circuits in the embodiment described above, the present invention is not limited to such structure, and it is possible to provide a microcomputer having software to perform such functions as a counter function, a preset function and a comparison function. In this way, it becomes possible to simplify the hardware structure of the observation apparatus.

Thus, because the observation apparatus according to the present invention controls the light emission period of the light-emitting bodies, the present invention makes it possible to simplify the structure of the driving circuits of the light-emitting bodies. Further, because light emission is carried out only at those times when illumination is required, the present invention makes it possible to suppress the generation of heat and provides a driving circuit structure that is economical in terms of energy consumption.

What is claimed is:

1. An observation apparatus for observing an observation object, comprising:
    a light-emitting portion for shining light onto the observation object;
    image detection means for receiving light reflected from or passing through the observation object;
    light emission period establishing means for establishing a light emission period for the light-emitting portion; and
    light emission control means which activates the light-emitting portion to emit light synchronous with a vertical synchronizing signal of the image detection means, and which terminates the emission of light from the light-emitting portion after the established light emission period has elapsed;
    wherein the light emission period establishing means is equipped with a preset portion for storing an initial value, and a counter portion which inputs the initial value and carries out a subtraction process in which the initial value is reduced by 1 each time a clock signal is inputted, the counter portion having a value N, in which the light emission control means activates the light-emitting portion to emit light when N>0 and terminates light emission from the light emitting portion when N≦0.

2. The observation apparatus of claim 1, wherein the light-emitting portion comprises a plurality of light-emitting bodies, in which an initial value is established for each light-emitting body.

3. The observation apparatus of claim 1, wherein a horizontal synchronizing signal of the image detection means is used as a timing means for timing the light emission period.

4. The observation apparatus of claim 1, in which the light emission control means is equipped with a delay means to delay the vertical synchronizing signal only by a prescribed period T.

5. A method of observing an observation object with an observation apparatus, the observation apparatus having a light-emitting portion and an image detection means, the method comprising:

illuminating the observation object with the light-emitting portion;

receiving light reflected from or passing through the observation object with the image detection means;

establishing a light emission period for the light-emitting portion;

activating the light-emitting portion to emit light synchronous with a vertical synchronizing signal of the image detection means; and terminating the emission of light from the light-emitting portion after the established light emission period has elapsed;

wherein establishing a light emission period for the light-emitting portion further comprises storing an initial value and performing a subtraction process in which the initial value is reduced by 1 each time a clock signal is inputted to obtain a decremented value N;

wherein activating the light-emitting portion further comprises activating the light-emitting portion to emit light when the decremented value N>0; and wherein terminating the emission of light further comprises terminating the emission of light from the light-emitting portion when the decremented value N≦0.

6. The method of claim 5, wherein the light-emitting portion comprises a plurality of light-emitting bodies, the method further comprising:

establishing a light emission period for each of the plurality of light-emitting bodies.

7. The method of claim 5, wherein the light-emitting portion comprises a plurality of light-emitting bodies, the method further comprising:

controlling an ON/OFF state of each of the light-emitting bodies and the light-emission period of each of the light-emitting bodies;

separating the light-emitting bodies into prescribed groups; and selecting one of the prescribed groups of light-emitting bodies for operation in accordance with a characteristic of the observation object.

* * * * *